2 Sheets—Sheet 1.
S. HULBERT.
Plow-Moldboard.
No. 337.
Reissued Jan. 1, 1856.
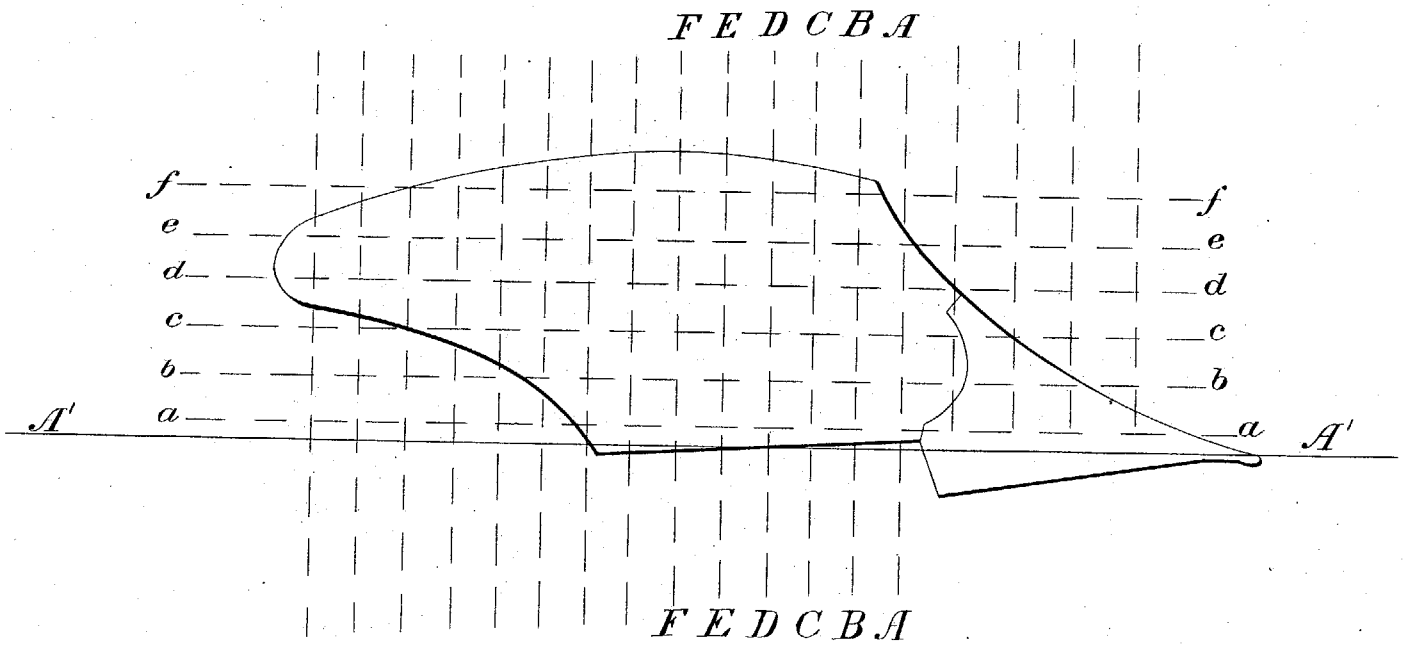
AM. PHOTO-LITHO. CO. N.Y. (OSBORNE'S PROCESS.)

2 Sheets—Sheet 2.
S. HULBERT.
Plow-Moldboard.
No. 337.
Reissued Jan. 1, 1856.
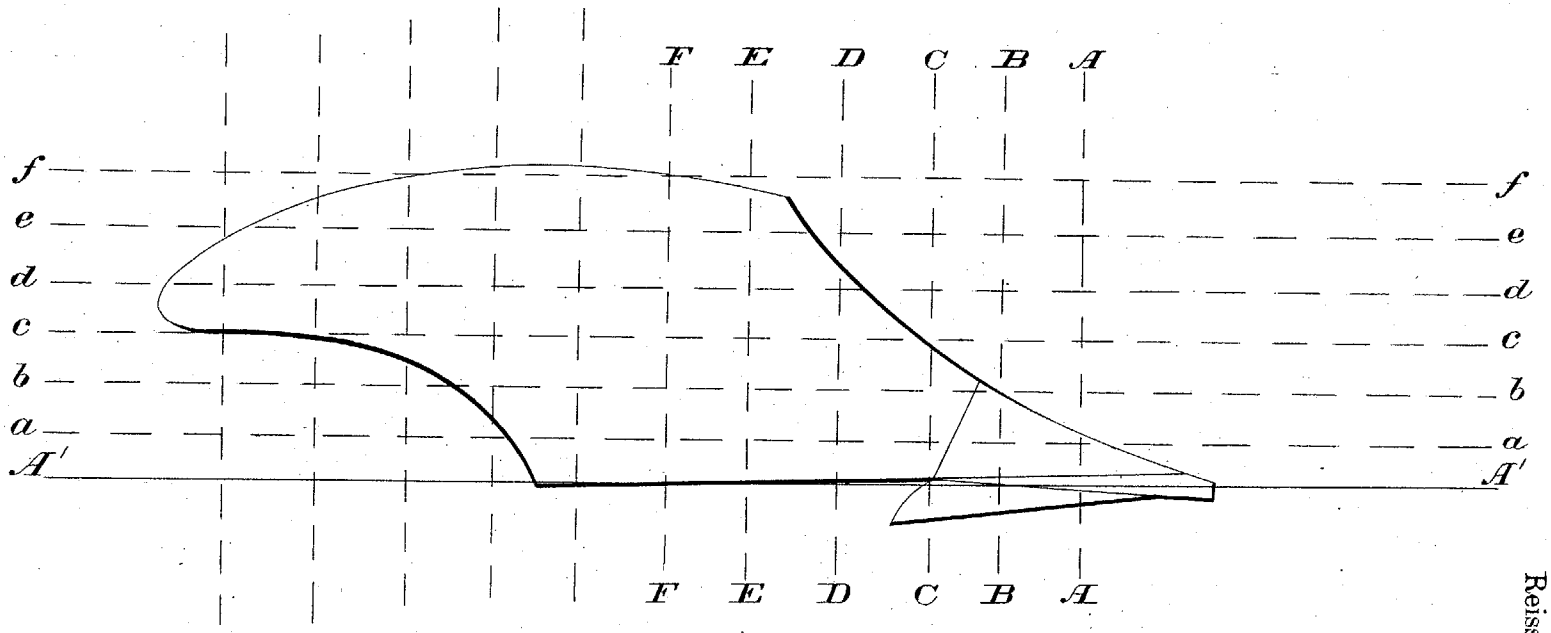
AM. PHOTO-LITHO. CO. N. Y. (OSBORNE'S PROCESS.)

UNITED STATES PATENT OFFICE.

SAML. HULBERT, OF OGDENSBURG, NEW YORK.

IMPROVEMENT IN PLOWS.

Specification forming part of Letters Patent No. 10,031, dated September 20, 1853; Reissue No. 337, dated January 1, 1856.

*To all whom it may concern:*

Be it known that I, SAMUEL HULBERT, of the village of Ogdensburg, county of St. Lawrence, State of New York, have invented various Improvements in the Agricultural Plow; and I do hereby declare that the following is a full and exact description of the same.

The nature of my invention consists in constructing the working side of the mold-board of a plow and that part of the share or point which also forms the mold-board uniformly convex from front to rear, and from the lower to the upper part, so that a concave arc of a circle, when applied horizontally, will fit in every part, and a concave arc of a circle, when applied vertically to the line of the base, shall adapt itself to every part of the said mold-board and share, they being so curved as to turn the furrow-slice. The advantages gained in the use of such a mold-board are lightness of draft, cleaning well in the most sticky soil, capability of cutting deep as well as shallow, turning the furrow well at any speed, ease of guidance, and great durability in consequence of easy draft, and in various trials found to be adapted to all kinds of plowing for sod, stubble, or breaking prairie.

For a better description reference is had to the accompanying drawing.

A′ A′ is a base-line. Then on applying a concave arc of a circle at A A B B C C, and so on vertically or cross-sectionally to the base A′ A′, an arc will adapt itself in every part of the mold-board and molding part of the share, and that a concave arc, when applied horizontally at *a a b b c c* and so on, shall also adapt itself to every part of the mold-board and share of the working side.

What I claim as my invention, and desire to secure by Letters Patent, is—

Constructing a mold-board and molding part of the share of a plow so that a horizontal line drawn at any height across their working-side shall describe a convex arc of a circle, and any line drawn across its working side at right angles to the base shall also describe the convex arc of a circle separately or connectedly, the whole or either part, substantially as set forth.

SAML. HULBERT.

Witnesses:
L. F. HARTSON,
HENRY CHANEY.